United States Patent
Packman

(10) Patent No.: US 9,945,405 B2
(45) Date of Patent: Apr. 17, 2018

(54) MODULAR FURNITURE SYSTEM

(71) Applicant: Ronald Keith Packman, London (GB)

(72) Inventor: Ronald Keith Packman, London (GB)

( * ) Notice: Subject to any disclaimer, the term of this patent is extended or adjusted under 35 U.S.C. 154(b) by 0 days.

(21) Appl. No.: 15/507,973

(22) PCT Filed: Aug. 21, 2015

(86) PCT No.: PCT/GB2015/052437
§ 371 (c)(1),
(2) Date: Mar. 1, 2017

(87) PCT Pub. No.: WO2016/034850
PCT Pub. Date: Mar. 10, 2016

(65) Prior Publication Data
US 2017/0234341 A1  Aug. 17, 2017

(30) Foreign Application Priority Data

Sep. 4, 2014 (GB) .................... 1415637.6

(51) Int. Cl.
*A47B 3/00* (2006.01)
*F16B 5/00* (2006.01)
(Continued)

(52) U.S. Cl.
CPC .............. *F16B 5/0084* (2013.01); *A47B 3/06* (2013.01); *A47B 47/0075* (2013.01);
(Continued)

(58) Field of Classification Search
CPC . A47B 47/0075; A47B 47/0091; A47B 87/00; A47B 87/005; A47B 87/007; A47F 19/005; A47F 4/02
See application file for complete search history.

(56) References Cited

U.S. PATENT DOCUMENTS 4,589,792 A    5/1986  Niziol
4,903,451 A *  2/1990  Gresswell .......... A47B 87/0276
                                                    312/111
(Continued)

FOREIGN PATENT DOCUMENTS

AT        409789 B      11/2002
EP        2567634 A1     3/2013
(Continued)

OTHER PUBLICATIONS

Search Report for Appl. No. GB1415637.6 dated Feb. 26, 2015, 1 pp.

(Continued)

*Primary Examiner* — Daniel J Rohrhoff
(74) *Attorney, Agent, or Firm* — James A. Sheridan; Sheridan Law, LLC

(57) ABSTRACT

A modular furniture system includes a plurality of panel elements having opposing first and second major faces, a perimeter wall defining a minor face therebetween, and at least a boss aperture which passes through the first and second major faces. A panel connector has a bridging element and at least two bosses in spaced apart relationship on the bridging element, each boss being a complementary fit in the boss aperture of a respective panel element, a first fastener recess in a distal free end of each boss, and a second fastener recess opposing the first fastener recess and adjacent to a proximal end of each boss. An oversized fastener associated with each boss has a panel-retaining head and a tail which is interengagable with the panel-retaining head.

20 Claims, 4 Drawing Sheets

(51) Int. Cl.
  *A47B 88/00* (2017.01)
  *A47B 47/00* (2006.01)
  *A47C 19/00* (2006.01)
  *A47B 3/06* (2006.01)
  *A47C 4/02* (2006.01)
  *F16B 5/02* (2006.01)

(52) U.S. Cl.
  CPC .......... *A47B 47/0091* (2013.01); *A47B 88/00* (2013.01); *A47C 4/02* (2013.01); *A47C 19/005* (2013.01); *F16B 5/02* (2013.01)

(56) References Cited

U.S. PATENT DOCUMENTS

| | | | | |
|---|---|---|---|---|
| 6,722,515 B2* | 4/2004 | Rumpel | ............. | B65D 11/1833 220/23.4 |
| 6,938,966 B1* | 9/2005 | Rouwhorst | .......... | A47B 87/008 312/111 |
| 2012/0242200 A1* | 9/2012 | Keragala | ............... | A47B 47/042 312/111 |
| 2015/0108880 A1* | 4/2015 | Chung | ............... | A47B 87/0292 312/108 |
| 2017/0175788 A1* | 6/2017 | Marcato | .................. | F16B 12/42 |

FOREIGN PATENT DOCUMENTS

| WO | 2012129261 A2 | 9/2012 |
|---|---|---|
| WO | 2014007642 A1 | 1/2014 |

OTHER PUBLICATIONS

International Search Report for Int. Appl. No. PCT/GB2015/052437, 2015-1207, 3 pp.

English translation of Abstract and Specification of AU409789B, Nov. 25, 2002, 4 pp.

* cited by examiner

MODULAR FURNITURE SYSTEM

The present invention relates to a modular furniture system, comprising panel elements, panel connectors and fasteners, particularly, but not necessarily exclusively, for the construction of home and garden furniture.

The majority of furniture sold is mass-produced and therefore, by necessity, is designed to be acceptable to a majority of customers. This means that, in general, furniture that is manufactured is of a limited number of sizes, shapes and colours. Obviously, not all rooms are of identical size and shape, and customer requirements differ. Therefore, the market for bespoke furniture is increasing in size.

However, bespoke furniture itself has drawbacks. Its main drawback is that it is markedly more expensive to obtain furniture built to a custom specification, than it is to buy furniture that is readily available in high street shops. This is due to the large amount of work that must go into designing and manufacturing one-off pieces of furniture, which is normally mitigated by the economies of scale when mass-producing furniture. Therefore, bespoke furniture is beyond the reach of most consumers budgets.

Modular furniture systems are known, and are often sold as 'flat-pack' furniture. These systems decrease the cost of the purchase of furniture by removing assembly from the manufacturing process, thereby leaving this activity to the consumer. Whilst decreasing cost, the kits often comprise many panels and connectors which are small and difficult to use, additionally necessitating the use of one or multiple tools in some cases, which introduces significant difficulty in assembly. At the very least, it makes the assembly of 'flat-pack' furniture challenging even to the able-bodied consumer, but where the consumer suffers from a disability affecting dexterity or motor skills, assembly can become almost impossible.

Whilst modular furniture can reduce the cost of buying furniture, once a particular piece of furniture has fulfilled its use and is no longer required, there are limited options for disposal. Selling used furniture can be difficult, often due to difficulties in shipping large items of furniture, especially as most modular furniture is not designed to be deconstructed following assembly. This generally results in sales of large or bulky furniture only being possible within a limited distance of the seller, beyond which it becomes unreasonable to collect a purchase personally. Furthermore, used furniture of the type usually sold in modular form, does not have a large resale value, making the effort of sale far more trouble to the seller than the sale is worth. This means that disposal as refuse is often unavoidable.

Given the emphasis now placed on environmental issues, recycling is the preferred means of disposal of surplus possessions. However, the ability to recycle large items which may be formed of materials such as wood and various plastics is not always readily available. In these cases, it would be advantageous to be able to reuse the furniture in a novel way. For instance, were a family to have bought a cot for their baby, which the baby had outgrown, it would be beneficial to be able to upgrade the cot into a small bed for a younger child, rather than disposing of the cot and separately purchasing a bed.

Therefore, it is the aim of the present invention to create a furniture system that overcomes the problems as described above. This furniture system is necessarily: modular, to enable the cost-effective construction of custom designs; simple to assemble, so as to be attractive to those to whom standard 'flat-pack' furniture is overly complicated; and also being capable of disassembly and reassembly in order to facilitate deconstruction of one item of furniture and reconstruction of another, as a method of recycling.

According to a first aspect of the invention, there is provided a modular furniture system comprising a plurality of panel elements having opposing first and second major faces, a perimeter wall defining a minor face therebetween, and at least a boss aperture which passes through the first and second major faces, a panel connector comprising a bridging element and at least two bosses in a spaced apart relationship on the bridging element, each boss being a complementary fit in the boss aperture of a respective said panel element, a first fastener recess in a distal free end of each boss, a second fastener recess opposing the first fastener recess and adjacent to a proximal end of each boss, and an oversized fastener associated with each boss, having a panel-retaining head being stepped to be receivable in the first fastener recess and to extend radially beyond an outer perimeter edge of the distal free end of a corresponding boss, and the tail being flushly or substantially flushly receivable in the second fastener recess.

The modular furniture system is advantageous due to it providing a user with a cost-effective system to create bespoke furniture in a desired configuration. Additionally, the system is simple to assemble, with uncomplicated connection mechanisms which do not necessarily require tools, unlike the connection mechanisms found in known modular furniture systems.

By the use of uncomplicated connection mechanisms, the system also enables straightforward disassembly, which means that a user can alter any created piece of furniture, even once it has been used. This is not only a preferable method of recycling, but also means that the size and design of a creation can be altered; for instance, a bed can be lengthened as a child grows.

The oversized fasteners also allow the system to be easily utilised by those who might otherwise struggle with the small, complicated connectors that are often found in modular furniture. For instance, the oversized fasteners included in the modular furniture system described herein would be advantageous to be used by those with arthritis, depleted motor skills or other disabilities, along with children, as the same level of dexterity normally essential for furniture construction is not necessary due to the larger, easily grasped components.

Beneficially, the first and second fastener recesses are connected by way of a fastener passage, in order that the first and second fastener recesses are not required to abut.

Preferably, the first and second major faces of at least one of the panel elements are substantially rectangular or triangular to enable the creation of different shapes of furniture.

Advantageously, at least one boss aperture is circular in order to enable a panel element to be rotatably engaged with a panel connector.

Alternatively, at least one boss aperture is square, or triangular, in order to limit the relative orientations of the panel element and panel connector.

Preferably, at least two of the boss elements of at least one panel connector are coplanar in order to enable two connected panel elements to be arranged in a coplanar orientation.

Alternatively, at least two of the boss elements of at least one panel connector may be non-coplanar, in order to allow two or more panel elements to be orientated at an angle to each other.

Preferably, at least two of the boss elements of at least one panel connector are arranged at 90° to each other, to enable two or more panel elements to be orientated at right-angles.

Furthermore, at least one panel connector may further comprise at least one separating wall, which in use abuts at least one panel element, for the provision of additional structural rigidity.

Preferably, at least one fastener exists wherein the panel-retaining head and tail are screw-threadably engageable, to enable tightening of the fastener.

Additionally or alternatively, the panel-retaining head includes an ergonomic gripping portion to enable a user to engage the fastener more easily. Optionally, the ergonomic gripping portion may be a plurality of grooves on a perimeter wall of the fastener.

Alternatively, the ergonomic gripping portion may comprise one or more indentations for receiving a user's fingers.

Preferably, the tail further comprises at least one stabilising recess in a when-in-use exterior surface of the fastener tail, for the engagement of a user's fingers or a tool to aid the tightening of the fastener.

Optionally, at least one fastener further comprises a decorative portion, to enhance the aesthetics of the modular furniture system. Additionally or alternatively, at least one fastener may further comprise a functional portion. Advantageously, this functional portion may be a hook or handle, for the attachment of a garment or other such item, or the pulling out of a drawer.

Preferably, the fastener will be oversized, wherein the panel retaining head is greater than 4 centimeters, and preferably no greater than 30 centimeters, in diameter. More preferably, the panel retaining head is between 10 and 20 centimeters in diameter. Most preferably, the panel retaining head is 15 centimeters in diameter. The oversized fastener enables easier connection for those who are young, old, or disabled.

Beneficially, the modular furniture system is provided in the form of a kit of parts. This enables simplified storage and transportation, whilst reducing manufacturing costs.

According to a second aspect of the invention, there is provided modular furniture formed using a modular furniture system in accordance with the first aspect of the invention. In this case, the furniture is preferably at least one of: a bed; a cot; a table; a chair; a desk; a cupboard; or a chest of drawers. However, other types of kinds of furniture may be envisaged.

The invention will now be more thoroughly described, with reference to the accompanying drawings, by way of example only, in which.

Figure 1A:
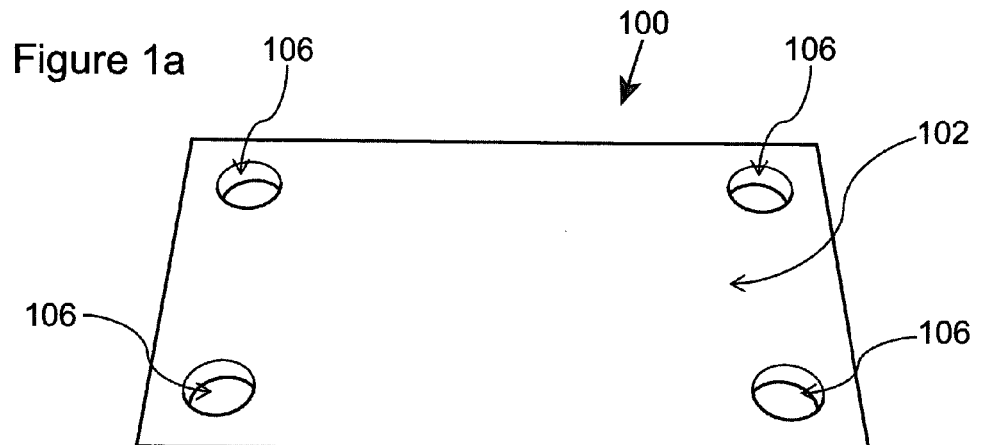
FIG. 1a is a perspective view of a first embodiment of a panel element forming part of a modular furniture system according to the first aspect of the invention.
Figure 1B:
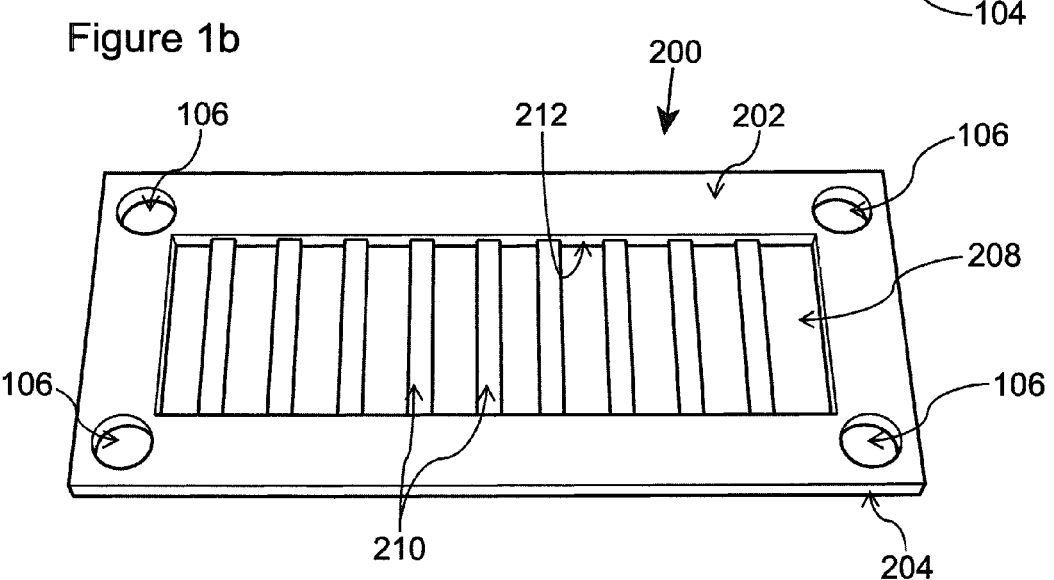
FIG. 1b is a perspective view of a second embodiment of a panel element forming part of a modular furniture system according to the first aspect of the invention.
Figure 1C:
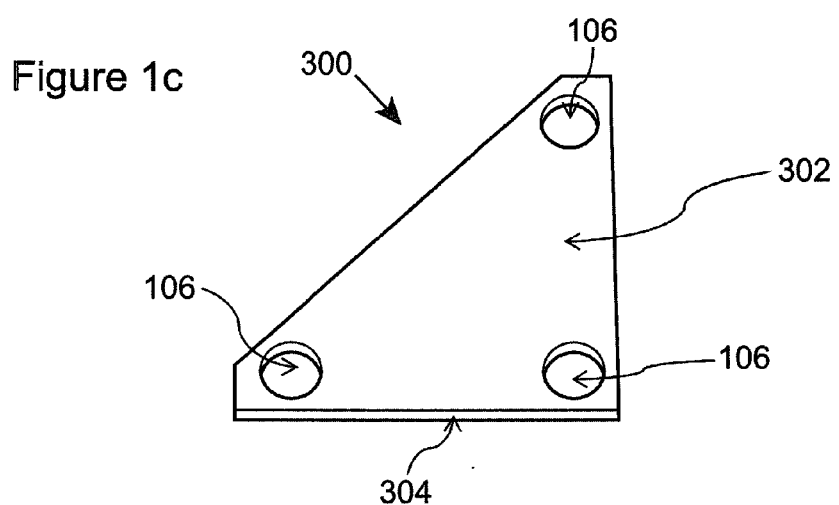
FIG. 1c is a perspective view of a third embodiment of a panel element forming part of a modular furniture system according to the first aspect of the invention.

Three embodiments of the panel element all forming part of a modular furniture system are depicted in FIGS. 1a, 1b and 1c.

Each panel element 100, 200, 300 comprises two opposing major faces 102, 202, 302 and a perimeter wall 104, 204, 304 interposed therebetween. The perimeter wall 104, 204, 304, orientated perpendicularly to the major faces 102, 202, 302, connects the opposing major faces 102, 202, 302, defining a planar panel.

Referring firstly to FIG. 1a, there is shown a first said panel element 100. The major faces of the first panel element 100 are planar and rectangular, and thus the panel element 100 can be considered to be cuboidal.

Four boss apertures 106, each of which passes through both the first and second major faces 102, are situated on or through the first panel element 100. However, additional boss apertures can be provided as required, see for example FIG. 4.

Each boss aperture 106 has a, preferably circular, cross-section, thus creating a cylindrical hole through the panel element 100. Furthermore, each boss aperture 106 is situated towards and adjacent to a separate or respective corner of the panel element 100, with the centre of each boss aperture 106 equidistant from the two contiguous minor faces 104 of the panel element 100 which define each respective corner.

FIG. 1b shows a second embodiment of a panel element 200 and therefore the similar features are labelled as such. However, this second panel element further comprises a rectangular window 208, situated centrally on the first major face 202, and extending through to the opposing second major face, thus defining a rectangular hole through the entirety of the second panel element 200. There are also shown nine slat elements 210, which extend perpendicularly from an interior face of the rectangular window to an opposing interior face 212 of the rectangular window 208. The said nine slat elements 210 are preferably equi-distantly spaced along said interior faces 212 or edges of the rectangular window 208. Although each has a rectangular cross-section, any other suitable cross-sectional shape can be considered. Additionally or alternatively, more or less than nine slat elements 208 may be utilised, as necessity dictates.

A third embodiment of a panel element 300 is described in FIG. 1c. The major faces 302 of this third panel element 300 are substantially triangular with one 90° vertex. However, the other two vertices have been chamfered or truncated, therefore allowing the boss apertures 106 located in each of these vertices to be situated closer to the perimeter wall 304 than would be possible were the panel to have pointed corners.

The major faces of the panel elements 100, 200, 300 described in FIGS. 1a, 1b and 1c are of rectangular or substantially triangular shape, but could also be substantially circular, hexagonal or any other desired shape. Equally, the boss apertures 106 situated on each panel element 100, 200, 300, whilst situated towards each corner of the panel elements 100, 200, 300 of the three embodiments shown, could alternatively be positioned parallel to a minor face 104, 204, 304 of the panel element 100, 200, 300, in the centre of the major faces 102, 202, 302 of the panel element 100, 200, 300, or in any other position on the major faces 102, 202, 302 of the panel element 100, 200, 300.

The panel elements 100, 200, 300 are preferably formed from a strong and rigid, or substantially rigid material, such as wood or metal, and whilst they are described as being solid, if the material is strong enough to retain the strength and rigidity necessary, each panel element 100, 200, 300 could be hollow, in order to reduce weight. Whilst each panel element 100, 200, 300 shown is opaque, there is also the possibility that the panel element 100, 200, 300 could be wholly or partly formed of a translucent or transparent material, so as to enable light to pass therethrough.

Figure 2A:
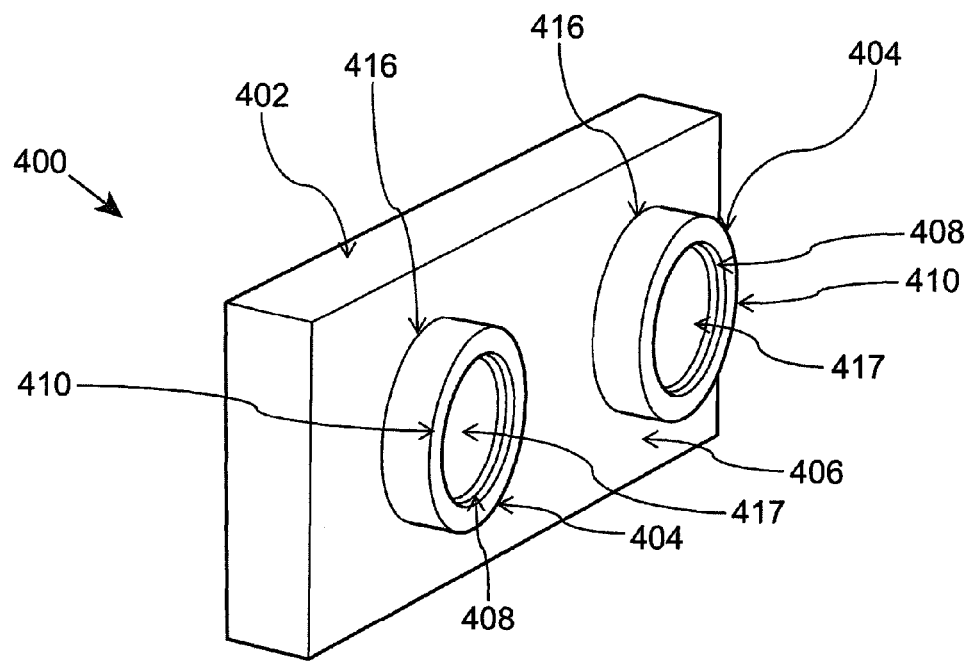
FIG. 2a is a perspective view of a first embodiment of a panel connector forming part of a modular furniture system according to the first aspect of the invention.

FIG. 2a depicts a first embodiment of a panel connector 400.

This first panel connector 400 comprises a bridging element 402 and two bosses 404. The bridging element 402 is preferably a planar rectangular plate. Each boss 404 is a cylindrical protrusion on a face 406 of the bridging element 402, complementarily shaped to be a close or tight tolerance fit with the boss apertures 106 of the panel elements 100, 200, 300 shown in FIGS. 1a, 1b and 1c. The two bosses 404 are in a spaced-apart relationship on said face 406, each boss 404 being positioned substantially centrally on its respective half of the bridging element 402.

Each boss 404 contains a first fastener recess 408 in its distal free end 410, which is, in this case, circular in cross-section. A second fastener recess is located on a back side surface of the bridging element 402 so as to be opposing each first fastener recess 408, and adjacent to a proximal end 416 of each boss. Additionally, there is provided a fastener passage 417 connecting the first fastener recess 408 and the second fastener recess. Each said fastener passage 417 is, in this embodiment, also circular in cross-section and positioned centrally within the first fastener recess 408 and second fastener recess.

Figure 2B:
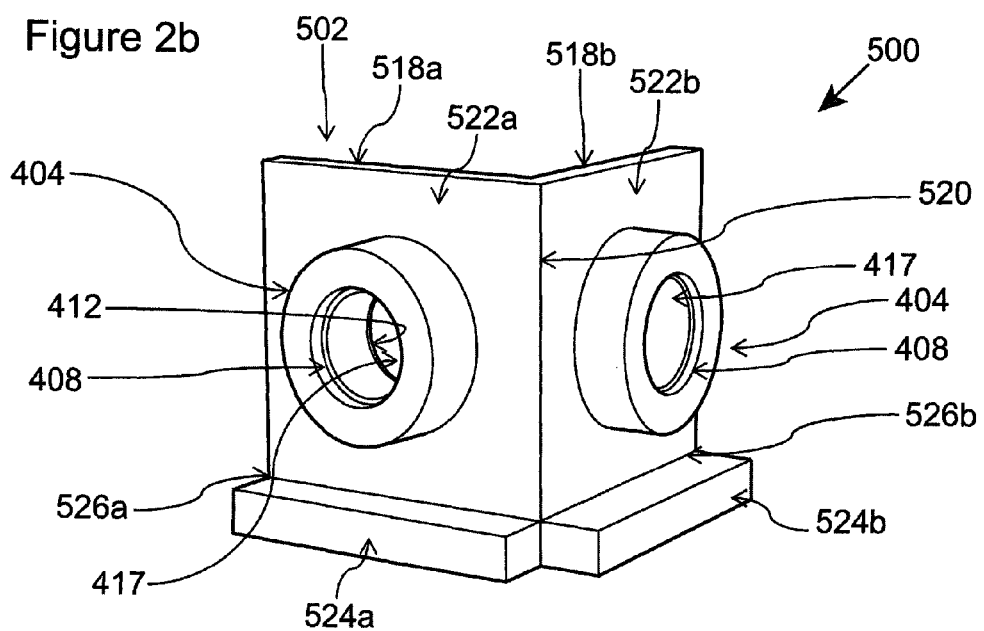
FIG. 2b is a perspective view of a second embodiment of a panel connector forming part of a modular furniture system according to the first aspect of the invention.

A second embodiment of a panel connector 500 is shown in FIG. 2b. A second bridging element 502 is constructed from first and second bridging portions 518a, 518b, which are conjoined along one edge 520 and angled at 90° to one another, thus together forming a bridging element 502 with an L-shaped cross-section, with two exterior faces 522a, 522b bordering the outside of the 90° angle, and two interior faces opposing the exterior faces 522a, 522b.

An outwardly-extending separating wall 524a, 524b protrudes along the length of the lowermost edge 526a, 526b of each exterior face 522a, 522b. The separating walls 524a, 524b are dimensioned so as to abut an engaged panel element, thus providing additional structural rigidity and support.

A boss 404 is provided substantially centrally on each exterior face 522a, 522b, each boss 404 further comprising first and second fastener recesses 408, 412 and a fastener passage 417, similarly to that described above with respect to first embodiment of the panel connector 400.

Figure 2C:
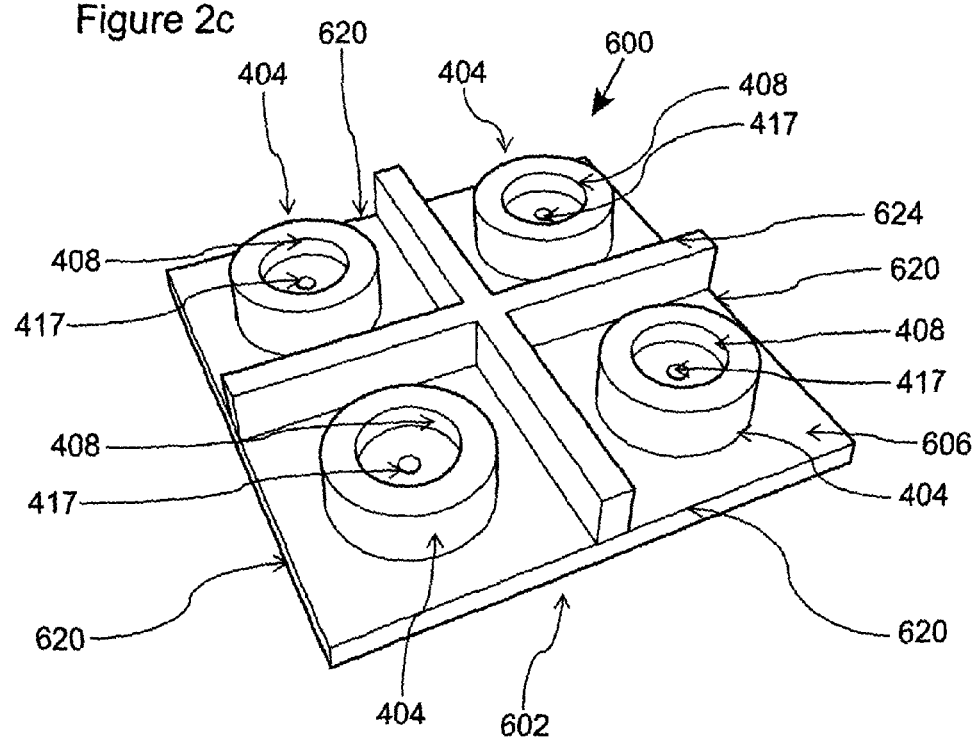
FIG. 2c is a perspective view of a third embodiment of a panel connector forming part of a modular furniture system according to the first aspect of the invention.

FIG. 2c shows a third embodiment of a panel connector 600 which is designed to connect one corner of each of four substantially abutting or intersecting panel elements.

This third bridging element 602 is generally square and planar. The bridging element 602 is divided into four equal sections by four, preferably conjoined, separating walls 624. The separating walls 624 protrude perpendicular to a major surface 606 of the third panel element 600, extend from the mid-points of each edge 620 of the said major surface 606, and converge in the centre, forming a cross-shape.

A boss 404, first and second fastener recesses 408, 412 and fastener passage 417, each as described above, are positioned in the centre of each one of the four equal sections. In so doing, the panel connector 600 allows a corner of each of four separate panel elements to be engaged with each boss 404, thus enabling the interconnection of four said panel elements.

Whilst the embodiments contained herein describe the bridging element 402, 502, 602 as being planar or comprising two bridging portions 518a, 518b at a 90° angle, these are not meant as limiting features of each said panel connector 400, 500, 600. It is reasonable to anticipate that a bridging element of a panel connector could contain additional bridging portions, and that each said bridging portion could be angled at any angle from between 0° and 180° to any adjoining bridging portion.

Additionally, there is no reason why a panel connector could not exist whereby boss elements could be situated on opposing faces, in order to allow a plurality of panel elements to be connected in a non-coplanar fashion.

Furthermore, a panel connector could comprise further bosses on the same panel connector, allowing the connection of three, four, or any other number of panel elements to each other. Alternatively, the use of, for instance, a panel connector with four bosses could enable two panel elements to be engaged with two bosses each, thus providing a more secure and stable connection between the two panel elements.

The separating wall 524a, 524b shown in FIG. 2b could be present on an uppermost edge or any other edge, depending on which portion is required to abut a panel element. There is also the possibility to provide separating walls on a plurality of sides, which could provide additional structural support to the modular furniture. Furthermore, separating walls could also be present across an interior portion of a face, rather than an edge, for instance in a cross formation on a panel connector comprising four bosses positioned in a square formation, whereby the cross formation separates each boss from the other three bosses. Any other formations of separating wall and boss should also be considered to be covered by the scope of the claims.

Each panel connector is anticipated to be formed of strong metal or plastics, such as stainless steel or high-density polyethylene, in order that the panel connector should be strong and rigid enough to provide the structural support necessary. It would also be reasonable for a panel connector to be formed from wood, or other such material, as long as the material in question still retained an acceptable level of strength and rigidity. If used outside, it would be preferable for the panel connectors to be formed of a weather resistant material, or coated with a material such as polyurethane, in order to provide a weather-proof seal around each component.

An exploded view of the engagement of a first embodiment of a fastener 700 with a portion of a panel connector 800 similar to those described above is depicted in FIG. 3.

The panel connector 800 shown may be a portion of the second panel connector 500, as shown in FIG. 2b, comprising a portion of a bridging element 502, boss 404, first and second fastener recesses 408, 412, fastener passage 417, and separating wall 524a.

A tail 702 of the fastener 700 comprises a headed tail end portion 704, dimensioned to be flushly receivable in the second fastener recess of a said panel connector 800, and a tail shaft 706. Protruding from a major face 708 of the tail end portion 704 is the cylindrical tail shaft 706, insertable in the fastener passage 417 of the panel connector 800. A distal end portion of the tail shaft 706 additionally comprises a screw-thread 710, or other suitable connection means, such as a push-fit connector. When the tail end portion 704 is flushly seated in the second fastener recess, the tail shaft 706 extends through so that the screw-threaded portion 710 of the tail shaft 706 projects into the first fastener recess 408.

A panel-retaining head 712 of the fastener 700 comprises a headed panel-retaining portion 714 and an engagement portion 716. The engagement portion 716 is shaped such as to fit flushly within the first fastener recess 408. When the engagement portion 716 is seated within the first fastener recess 408, the panel-retaining head 712 overlaps the distal end of the boss 404 and extends radially outward, overhanging the perimeter edge of the boss 404.

Embedded centrally within the engagement portion 716 is a screw-threaded recess or other suitable interconnection means. The screw-threaded recess is shaped to screw-threadingly engage with the screw-threaded portion 710 of the tail shaft 706, thus allowing the two parts of the fastener 700 to tighten together, and provide a clamping force on the boss 404. If a panel element was to be engaged with the boss 404 of the panel connector 800, the panel-retaining head 712 would overhang the panel element, retaining it, whilst tightening of the fastener 700 would preferably provide a clamping force on the panel, holding it more securely in the desired position.

Connection means other than a screw-thread could be considered as alternatives. These connection means could include detents or ridges, or simply just an interference fit which induces a frictional retaining force. A screw-thread connection is preferable, however, in order to retain relative simplicity combined with ease of connection and disconnection.

The fastener 700 is anticipated as being constructed from similar materials to those considered for the panel connector, such as plastics or metals, the necessary properties being relatively similar between the two components. When used in an outside environment, or other moist and warm environments such as a room containing a swimming pool, it would be advantageous for the panel connector and fastener components, if formed of metal, to be formed from the same metal, in order to reduce the occurrence of galvanic corrosion.

Each fastener may preferably include ergonomic features, such as finger-grip recesses in its perimeter surface. Furthermore, either additionally or alternatively, the fastener head in particular could further comprise a decorative element or an accessory-mounting element, such as an embossed pattern, raised football shape decoration, a flower and such like, in order to increase the decorative appeal of any furniture formed using the system. Such decorative features could allow a user, such as a child, to customise their bed or other furniture. Likewise, each fastener could alternatively comprise an added functional element, for instance a hook for hanging garments, or a handle for the opening of a drawer formed by one or more of the panel elements. These decorative and functional features are applicable for attachment to either or both of the panel-retaining head or tail of the fastener, and may be integrally formed as one-piece with the head, or may be releasably attachable as a post-assembly customisation, for example, via a screw-threaded fastener or adhesive.

Figure 4:
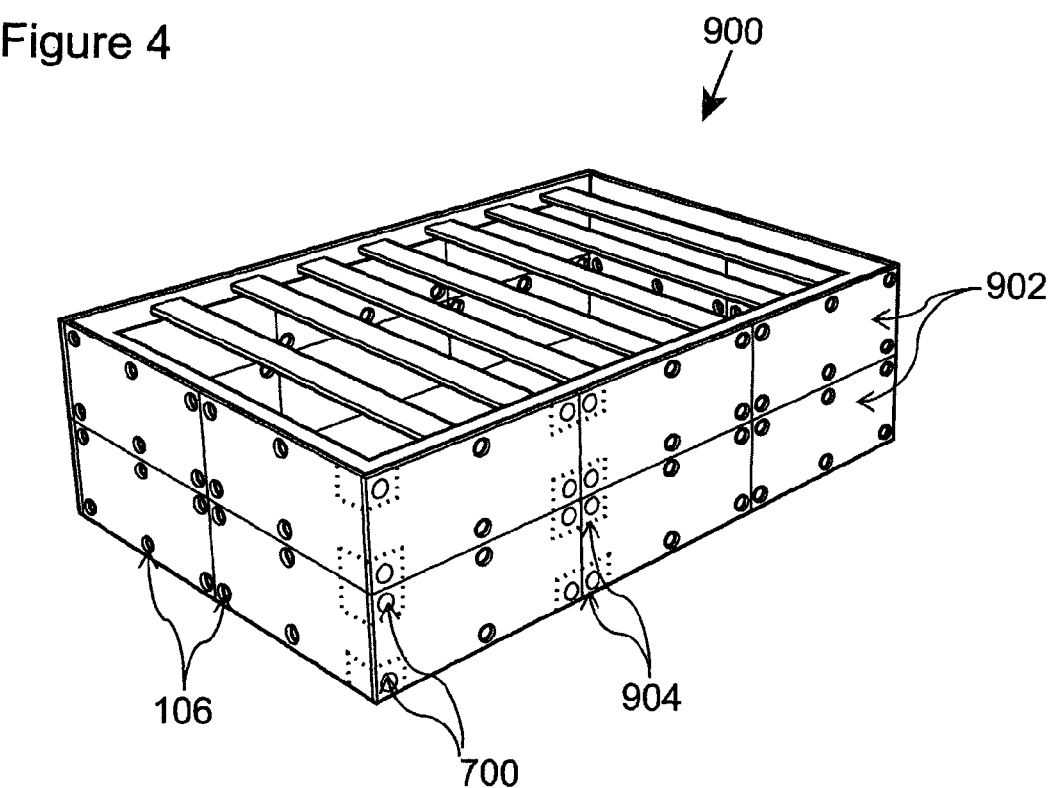
FIG. 4 is perspective view of a bed constructed from the modular furniture system, according to the first aspect of the invention.

FIG. 4 shows a plurality of panel elements 902, panel connectors 904 and fasteners, interconnected to form a bed frame 900, by way of non-limiting example.

Each longitudinal side of the bed frame 900 comprises six rectangular panel elements 902, arranged in a three by two formation, and each lateral side comprises four rectangular panel elements 902, arranged in a two by two formation. Each panel element 902 is, in this case, identical, and includes six boss apertures 106, with one boss aperture 106 situated at each vertex and one boss aperture 106 at the mid-point of a long side of each panel element 902.

A variety of said panel connectors 904 are engaged with the panel elements 902 at the abutting edges of the panel elements 902, thus connecting each panel element 902 with adjacent panel elements 902, securing the structure of the bed frame 900. A fastener 700 is engaged within each boss, providing a clamping force between each panel connector 904 and corresponding panel element 902, further stabilising the bed frame 900. The panel connectors 904 of two such panel elements 902 are shown, with dotted lines denoting the outer perimeter of each panel connector 904. Other panel connectors 904 have been omitted from FIG. 4, to aid clarity.

The construction of the bed frame 900 is carried out by first having one panel element 902 with further panel elements 902 being connected in turn by way of panel connectors 904 and the above-described oversized fasteners 700. The longitudinal and lateral sides of the bed frame 900 utilise planar panel connectors 904 to engage adjacent panel elements 902 in a coplanar manner. The longitudinal and lateral sides are then connected to each other by way of additional panel connectors 904 wherein the bosses of the panel connectors 904 are displaced by 90° to each other. The connection of the longitudinal and lateral sides then completes the main 4-sided construction of the bed frame 900. A mattress support structure, not shown, is then affixed to the top of the bed frame 900, which enables the structure to support a mattress. For example, it is beneficial to utilise a plurality of connectors similar to that shown in FIG. 3, inverted and with the out-turned wall reversed to enable support of the mattress support structure.

Further panel elements 902 and panel connectors 904 could be combined with the bed frame 900, in order to add supplementary features. For instance, two of the triangular panel elements of FIG. 1c could be attached perpendicularly to a longitudinal side of the bed frame via a number of 90° panel connectors. By then affixing a rectangular panel element to the said triangular panel elements, a bed-side table structure can be formed. Alternatively by attaching a layer of panel connectors as shown in FIG. 1b around a top edge of the bed frame, a cot structure can be formed. By utilising similar variations of panel connectors and panel elements, further structures would be able to be constructed by a user, such as a chair, including a sofa, and/or a table, such as a coffee table, dining table and/or kitchen table.

It will be appreciated that the above-described examples represent only a few exemplary embodiments of the many varied types of furniture which could be constructed using the present invention. Desks, cupboards or chests of drawers are merely a few such possibilities, and the present modular furniture system is sufficiently flexible so as to be able to create almost any kind of furniture of any size or shape, inclusive of those items of furniture having moving parts.

Figure 3:
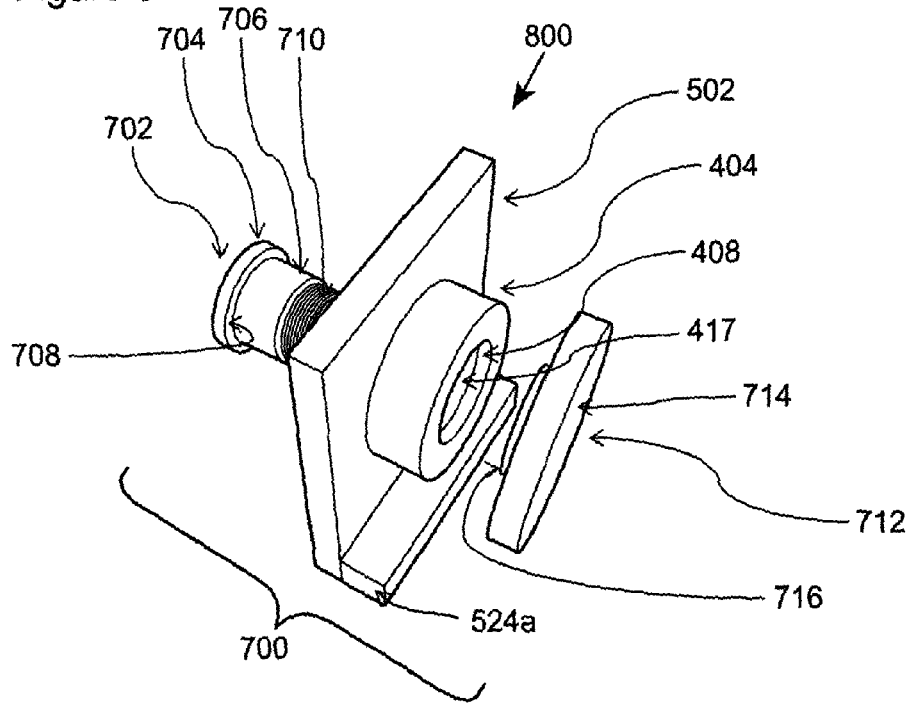
FIG. 3 is an exploded perspective view of a portion of one said panel connector along with a fastener.

Furthermore, whilst the oversized fasteners depicted in FIGS. 3 and 4 are shown having a given dimension, having a diameter of 15 centimeters, it will be apparent that the critical feature is that the fastener is oversized so as to be easily gripped by the user. Given the average hand span of a user, this would logically suggest that the diameter of the fastener should be at least 4 centimeters in diameter, and preferably no more than 30 centimeters, and preferably still in the range of 10 to 20 centimeters; however, any appropriately oversized fastener could be used.

It is therefore possible to provide a modular furniture system which comprises: a plurality of panel elements each having at least one boss aperture; a panel connector having at least two bosses for engagement with the boss apertures of the panel elements, a first fastener recess in the distal end of each boss, a second fastener recess opposing the first fastener recess and adjacent to the proximal end of each boss; and at least two oversized fasteners, which retain each panel element on the panel connector, enabling the construction of bespoke furniture. By the use of similar or identical panel elements and/or panel connectors, the furniture can be adapted and repurposed, reduced in size or expanded to meet differing requirements. As such, further panel elements and connectors can be purchased as and when required, rather than the furniture being disposed of and an entire new system being purchased.

The words 'comprises/comprising' and the words 'having/including' when used herein with reference to the present invention are used to specify the presence of stated features, integers, steps or components, but does not preclude the presence of addition of one or more other features, integers, steps, components or groups thereof.

It is appreciated that certain features of the invention, which are, for clarity, described in the context of separate embodiments, may also be provided in combination in a single embodiment. Conversely, various features of this invention which are, for brevity, described in the context of a single embodiment, may also be provided separately or in any suitable sub-combination.

The embodiments described above are provided by way of examples only, and various other modifications will be apparent to persons skilled in the field without departed from the scope of the invention as herein described.

The invention claimed is:

1. A modular furniture system comprising:
   a plurality of panel elements having opposing first and second major faces, a perimeter wall defining a minor face therebetween, and at least a boss aperture which passes through the first and second major faces;
   a panel connector comprising a bridging element and at least two bosses in spaced apart relationship on the bridging element, each boss being a complementary fit in the boss aperture of a respective said panel element, a first fastener recess in a distal free end of each boss, a second fastener recess opposing the first fastener recess and adjacent to a proximal end of each boss; and
   an oversized fastener associated with each boss having a panel-retaining head and a tail adapted to inter-engage with the panel-retaining head, the panel-retaining head being stepped so as to be received in the first fastener recess and to extend radially beyond an outer perimeter edge of the distal free end of a corresponding boss, and the tail being adapted to be flushly or substantially flushly received in the second fastener recess.

2. A modular furniture system as claimed in claim 1, wherein the first and second fastener recesses are connected by way of a fastener passage.

3. A modular furniture system as claimed in claim 1, wherein the first and second major faces of at least one panel element are rectangular or substantially rectangular, or are triangular or substantially triangular.

4. A modular furniture system as claimed in claim 1, wherein at least one boss aperture has a circular or substantially circular cross-section, or has a triangular or substantially triangular cross-section, or has a square or substantially square cross-section.

5. A modular furniture system as claimed in claim 1, wherein at least two of the boss elements of at least one panel connector are coplanar, non-coplanar, or at 90° to each other.

6. A modular furniture system as claimed in claim 1, wherein the panel connector further comprises at least one separating wall, which in use abuts at least one panel element, for the provision of additional structural rigidity.

7. A modular furniture system as claimed in claim 1, wherein the panel-retaining head and tail are screw-threadably engageable.

8. A modular furniture system as claimed in claim 1, wherein the panel-retaining head includes an ergonomic gripping portion.

9. A modular furniture system as claimed in claim 8, wherein the ergonomic gripping portion is a plurality of grooves on a perimeter wall of the fastener head.

10. A modular furniture system as claimed in claim 8, wherein the ergonomic gripping portion comprises one or more indentations for receiving a user's fingers.

11. A modular furniture system as claimed in claim 1, wherein the tail further comprises at least one stabilising recess in a when-in-use exterior surface of the tail.

12. A modular furniture system as claimed in claim 1, wherein at least one fastener further comprises a decorative portion.

13. A modular furniture system as claimed in claim 1, wherein at least one fastener further comprises an accessory mounting portion for mounting an accessory.

14. A modular furniture system as claimed in claim 1, wherein the at least one panel-retaining head is greater than 4 centimeters in diameter.

15. A modular furniture system as claimed in claim 14, wherein said at least one panel-retaining head is no greater than 30 centimeters in diameter.

16. A modular furniture system as claimed in claim 15, wherein said at least one panel-retaining head is between 10 and 20 centimeters in diameter.

17. A modular furniture system as claimed in claim 16, wherein said at one panel-retaining head is 15 centimeters in diameter.

18. A modular furniture system as claimed in claim 1 in the form of a kit of parts.

19. Modular furniture formed using a modular furniture system as claimed in claim 1.

20. Modular furniture as claimed in claim 19, which is at least one of: a bed; a cot; a table; a chair; a desk; a cupboard; or a chest of drawers.

* * * * *